(12) United States Patent
Dorsch et al.

(10) Patent No.: US 6,338,280 B1
(45) Date of Patent: Jan. 15, 2002

(54) SENSOR ARRANGEMENT

(75) Inventors: Bernd Dorsch, Unterleinleiter; Hans-Peter Hohe, Heiligenstadt; Dieter Seitzer, Erlangen, all of (DE)

(73) Assignee: Fraunhofer-Gesellschaft zur Foerderung, Munich (DE)

( * ) Notice: Subject to any disclaimer, the term of this patent is extended or adjusted under 35 U.S.C. 154(b) by 0 days.

(21) Appl. No.: 09/623,697

(22) PCT Filed: Dec. 22, 1998

(86) PCT No.: PCT/EP98/08412

§ 371 Date: Oct. 18, 2000

§ 102(e) Date: Oct. 18, 2000

(87) PCT Pub. No.: WO99/45342

PCT Pub. Date: Sep. 10, 1999

(30) Foreign Application Priority Data

Mar. 3, 1998 (DE) .......................... 198 08 929

(51) Int. Cl.$^7$ ................................. G01L 3/02
(52) U.S. Cl. ................... 73/862.193; 73/862.69; 324/215
(58) Field of Search ............... 73/779, 862.331, 73/862.332, 862.333, 862.334, 862.335, 862.193, 862.69; 324/215

(56) References Cited

U.S. PATENT DOCUMENTS

| | | | | |
|---|---|---|---|---|
| 4,200,814 A | * | 4/1980 | Tanaka et al. | 327/358 |
| 4,344,023 A | * | 8/1982 | Yokobori et al. | 318/254 |
| 4,875,011 A | * | 10/1989 | Namiki et al. | 324/251 |
| 5,406,202 A | | 4/1995 | Mehrgardt et al. | 324/251 |
| 5,640,090 A | * | 6/1997 | Furuya et al. | 324/251 |

* cited by examiner

Primary Examiner—Max Noori
(74) Attorney, Agent, or Firm—Michael A. Glenn

(57) ABSTRACT

A sensor arrangement for detecting a variable that is to be measured, has at least two substantially similar sensor elements. These sensor elements each produce an output signal in response to the variable to be measured, the output signals having a Hall voltage disturbance component. The two sensor elements are orientated in relation to each other in such a way that a sensor signal can be produced by a combination of their output signals, the Hall voltage disturbance components being compensated in the sensor signal.

7 Claims, 1 Drawing Sheet

SENSOR ARRANGEMENT

The present invention relates to a sensor arrangement for detecting a variable which is to be measured, and, in particular, it refers to a sensor arrangement whose output signal is compensated with regard to a Hall voltage disturbance component.

The Hall effect is a phenomenon which is well known in the field of technology and which is based on the Lorentz force. This Lorentz force deflects electrons, which normally pass through a conductor in a straight line, at right angles to the current and field direction. It follows that e.g. in a plate through which a current flows and which is arranged in a magnetic field, different concentrations of electrons will occur at two opposed sides, whereby a transverse voltage will be generated, which is referred to as Hall voltage. Known Hall generators and Hall sensors utilize this effect. In these known devices the Hall effect is used in a positive manner.

There are, however, cases of use where the Hall effect causes a disturbance component of a useful signal. Such a disturbance component superimposes itself on the useful signal and can therefore corrupt the result of the measurement e.g. in the case of sensors whose output signal can be influenced by the Hall effect. Such a corruption of the measurement result is, of course, an inaccuracy and may cause malfunctions of devices whose operation is based on these measurement results.

Figure 2:
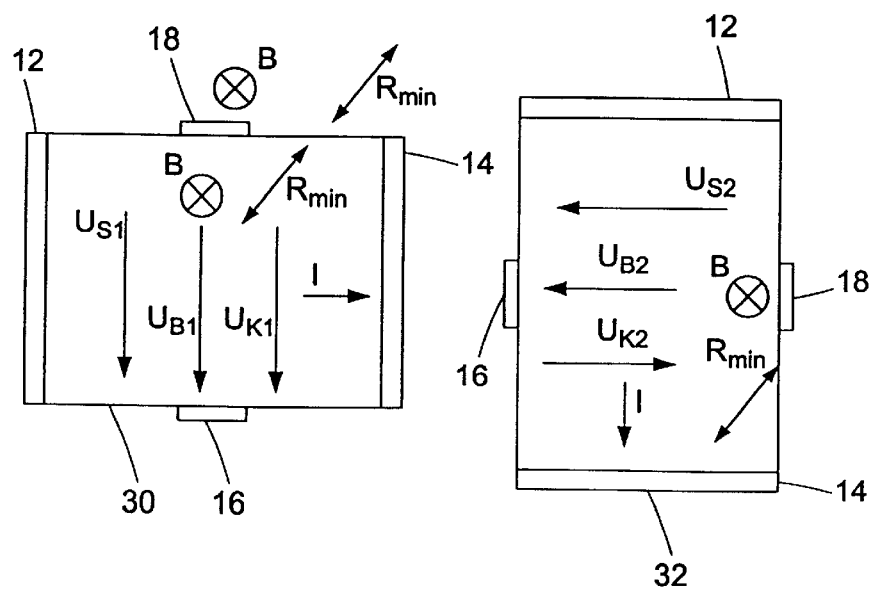

DE 43 02 342 Al refers to a sensor arrangement for measuring magnetic fields; in FIG. 2 of this publication, a Hall element arrangement is shown in which four Hall elements are arranged such that they are displaced by 90° relative to one piezoelectric effects in a semiconductor element, the semiconductor element being provided with a Hall sensor arrangement comprising two Hall sensors which are displaced by 90° relative to each other. Signals produced by a Hall effect serve as useful signals for detecting a magnetic field, the sense of the arrangement of the two Hall elements being the compensation of piezoelectric effects which corrupt the useful signal.

Also Electronics Week, Vol. 58, No. 17, April 1985, Technology Readout, "Sensors. Improved Hall Devices Find New Uses" refers to an orthogonal arrangement of Hall elements for compensating in this way the effects of a load on a Hall sensor.

It is the object of the present invention to provide a sensor arrangement used for detecting a variable to be measured and producing an output signal which is substantially free from Hall voltage disturbance components.

This object is achieved by a sensor arrangement according to claim 1.

The present invention provides a sensor arrangement for detecting a force to be measured or a torque to be measured, which comprises at least two substantially similar sensor elements. These sensor elements each produce an output signal in response to the force to be measured or the torque to be measured, the output signals of these sensor elements having a Hall voltage disturbance component and a signal component produced by the force or the torque. The two sensor elements are arranged such that they displaced relative to each other by substantially 90°. A means for subtracting the two output signals for producing a sensor signal is provided in which the Hall voltage disturbance components are substantially compensated and the signal another. This arrangement is, however, not used for eliminating Hall voltage disturbance components, since the Hall voltage serves as a useful signal. On the contrary, this circuit arrangement serves to eliminate offsets caused by inhomogeneities of the material of the Hall element, by image distortions from the constructional drawing to the finished Hall element and by a mechanical load on the Hall element.

EP 0727 644 Al refers to a sensor arrangement in the case of which the Hall effect is used for detecting a variable to be measured. This arrangement is used for contact-free detection of the speed of a rotating gear, two Hall sensors being operated in a differential circuit; the Hall sensors are arranged such that they are displaced by 90° relative to each other so as to suppress disturbing signals. A permanent magnet is provided by means of which the Hall elements are constantly exposed to a magnetic field so that a change of the magnetic field caused by the rotation of a gear can be detected by the Hall elements. It follows that the arrangement of two Hall elements serves to compensate disturbing piezoelectric effects caused by mechanical stresses. The Hall voltage is therefore used as a useful signal.

The technical publication "Design-und Elektronik" 12, Jun. 11, 1996, pages 47 to 49 refers to Hall sensors and in particular to Hall sensors produced by means of CMOS technology.

U.S. Pat. No. 4,875,011 A refers to an arrangement of Hall elements in the case of which the Hall effect is used for producing useful signals, whereas piezoresistive effects, which lead to a corruption of the useful signal, are compensated.

EP 0035103 Al discloses a method of compensating components produced by the force or the torque are substantially added.

The output signals of the two sensor elements are preferably based on a voltage which depends on the variable to be measured and which is superimposed by a Hall disturbance voltage, the sensor elements being then arranged such that, in the case of one sensor element, the voltage depending on the variable to be measured and the Hall disturbance voltage have the same polarity, whereas, in the case of the other sensor element, the voltage depending on the variable to be measured and the Hall disturbance voltage have opposite polarities. This is achieved by arranging the two sensor elements such that they are displaced by 90° relative to each other with regard to the direction in which the voltage depending on the variable to be measured is produced. The Hall voltage disturbance components can then be compensated by subtracting the two sensor-element output signals from each other.

In accordance with preferred embodiments of the present invention the at least two sensor elements are arranged on a common support.

In comparison with individual sensors, the sensor arrangement according to the present invention is twice as sensitive, the signal-to-noise ratio being simultaneously increased by the factor √2. In order to provide an even more far-reaching improvement of the sensor properties, i.e. of the sensitivity and of the signal-to-noise ratio, a plurality of sensor pairs can be realized on one chip, the increased by the factor √2. In order to provide an even more far-reaching improvement of the sensor properties, i.e. of the sensitivity and of the signal-to-noise ratio, a plurality of sensor pairs can be realized on one chip, the respective sensor pairs being realized e.g. on a common chip in the manner described in the present invention.

Figure 1:
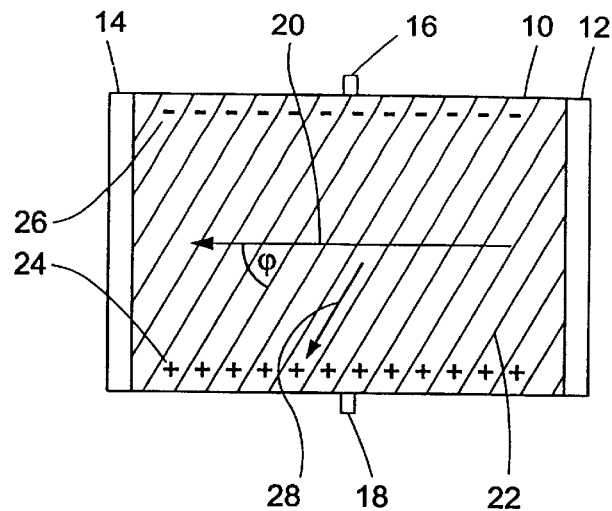

In the following, preferred embodiments of the present invention will be explained in detail making reference to the drawings enclosed, in which:

FIG. 1 shows a schematic view of a sensor element for use with a preferred embodiment of the sensor arrangement according to the present invention; and FIG. 2 shows a schematic representation of the preferred embodiment of the sensor arrangement according to the present invention.

Making reference to FIG. 1, the structure of a sensor element which is adapted to be advantageously used for the present invention will first be explained in the following.

Such a sensor element is provided with a doped semiconductor region 10 having a substantially rectangular shape. At two opposed lateral surfaces of the semiconductor region 10, electrodes 12 and 14 are provided, which serve as control contacts. As can be seen in the figure, the control contacts 12 and 14 are disposed in spaced relationship with each other, the semiconductor region 10 being arranged between them. Electrodes 16 and 18, which serve as sensor electrodes, are arranged on lateral surfaces of the semiconductor region 10, which are also disposed in opposed relationship. In the sensor element shown, the lateral surfaces on which the sensor contacts 16 and 18 are located extend at an angle of substantially 90° relative to the lateral surfaces on which the control contacts 12 and 14 are located. Hence, the lateral surfaces having the sensor contacts 16 and 18 arranged thereon connect the lateral surfaces having the control contacts 12 and 14 arranged thereon.

In the following, the mode of operation of the sensor element shown in FIG. 1 will be explained.

The two opposed control contacts 12 and 14 are operated with a suitable control voltage or a suitable control current so as to cause a flow of current through the doped semiconductor region 10. This flow of current is indicated by arrow 20 in the figure. When a force acts on the semiconductor region 10, a lower-resistance direction will occur in the semiconductor region parallel to the dilation direction, i.e. the direction in which the atomic distances are enlarged due to the action of a force; when suitably oriented, this lower-resistance direction will cause a deflection of the current 20 flowing through the semiconductor region 10. The dilation direction depends on the direction of the force acting on the semiconductor region as well as on the nature of this force. In the figure, the lines of the lower resistance are shown at 22.

Due to the deflection of the flow of current 20 in the semiconductor region 10, charges 24 and 26 are generated at the edges of the semiconductor region 10 which have the sensor contacts 16 and 18 attached thereto. Positive charges 24 are, for example, generated on the side of the sensor contact 18, whereas negative charges 26 are generated on the side of the sensor contact 16. The aimed at current direction for generating these charges 24 and 26 is shown at 28 and extends along the lines of lower resistance 22.

The charges 24 and 26 generated at the edges of the semiconductor region 10 can be tapped off via the sensor contacts 16 and 18 as a voltage difference and, consequently, as an output signal of the force/torque sensor according to the present invention. The angle $\phi$ formed between the original current direction 20 and the dilation direction represented by the lines of lower resistance 22 influences the magnitude of the output signal. The greatest effect is produced in the case of an angle $\phi$ of 45°, whereas the effect tends to zero when this angle approaches 0° or 90°. Hence, it will be advantageous to choose the semiconductor region such that it is adapted to be acted upon by a force in the case of which the angle $\phi$ between the dilation direction of the semiconductor region and the flow of current is essentially 45°. The highest possible sensitivity can be achieved in this way.

Alternatively to the example explained hereinbefore with reference to FIG. 1, such a sensor element could also be realized by means of a field effect transistor. The semiconductor region is in this case defined by the channel of the field effect transistor. The drain electrode and the source electrode define the two control contacts. Via these control contacts and via the gate electrode of the field effect transistor a suitable drain current is produced. Furthermore, additional sensor contacts are attached to opposed longitudinal sides of the channel region.

FIG. 2 shows a preferred embodiment of the sensor arrangement according to the present invention, which comprises two sensor elements 30 and 32. The sensor elements 30 and 32 have the form which has been described with reference to FIG. 1.

In order to compensate the influence of magnetic fields, which is caused by the Hall effect, when forces are measured by means of a piezoresistive force sensor of the type shown in FIG. 1, the two sensors 30 and 32 of the above-mentioned kind are arranged such that they are displaced by 90° relative to each other. A current flow I is generated in the two sensor elements 30 and 32 via the contact electrodes 12 and 14 of these sensor elements. As has been explained hereinbefore with reference to FIG. 1, the application of a force to the two sensor elements has the effect that, parallel to the dilation direction, a direction of lower resistance, which is shown in FIG. 2 as $R_{min}$, is produced in the semiconductor region of these sensor elements. This results in a signal voltage $U_{K1}$ in the sensor element 30 and in a signal voltage $U_{K2}$ in the sensor element 32.

As can be seen in FIG. 2, the two sensor elements 30 and 32 are exposed to a magnetic field B. This magnetic field B generates together with the current flow I through the semiconductor regions of the sensor elements a Hall effect resulting in a Hall voltage $U_{B1}$ in the sensor element 30 and a Hall voltage $U_{B2}$ in the sensor element 32. This Hall voltage superimposes itself on the signal voltage of the sensor elements. The resultant output voltage that can be tapped off via the sensor contacts 16 and 18 is called $U_{S1}$ in the case of sensor element 30 and $U_{S2}$ in the case of sensor element 32.

In the case of the sensor element 30 the signal voltage $U_{K1}$ and the Hall voltage $U_{B1}$ have the same polarity. In contrast to this, the signal voltage $U_{K2}$ and the Hall voltage $U_{B2}$ of the sensor element 32 have different polarities due to the fact that this sensor element 32 has been rotated by 90° relative to the sensor element 30.

In order to cause a compensation of the Hall voltage disturbance component contained in the output signals $U_{S1}$ and $U_{S2}$, these output signals $U_{S1}$ and $U_{S2}$ of the two individual sensors are subtracted, whereby the components $U_{B1}$ and $U_{B2}$ produced by the magnetic field B in the sensor output signal, which represents the measured variable, nullify each other. This sensor signal is calculated as follows:

$$U_{ges} = U_{S1} - U_{S2} = (U_{B1} + U_{K1}) - (U_{B2} - U_{K2}) = 2U_K$$

wherein $U_{B1} = U_{B2}$ and $U_K = U_{K1}$ and $U_{K2}$.

The 90° rotation of the two sensor elements relative to one another has the effect that the position between the dilation direction $R_{min}$ and the current flow I differs by 90° in the two elements. This results in opposite signs for the components $U_{K1}$ and $U_{K2}$ produced by the action of a force in the output signal; in the above-explained subsequent subtraction of the signals, these different signs result in an addition of the magnitudes of $U_{K1}$ and $U_{K2}$. It follows that, in comparison with a single sensor, the sensor arrangement according to the present invention, which comprises at least two sensor elements arranged in the manner described, is twice as sensitive, the signal-to-noise ratio being simultaneously increased by the factor $\sqrt{2}$.

In order to be able to realize an even more far-reaching improvement of the sensor properties, in particular of the sensitivity and of the signal-to-noise ratio, the present invention offers the possibility of realizing on one chip a plurality of sensor pairs of the type shown in FIG. 2.

To those skilled in the art it will be apparent that the present invention cannot only be used for the force/torque sensor shown in FIG. 1, but that it is equally suitable to be used for any imaginable sensor in the case of which the output signal is influenced by an undesired Hall effect. In addition, it is apparent that the plurality of sensor elements according to the present invention can be arranged on a common support or, alternatively, on different supports.

what is claimed is:

1. A sensor arrangement for detecting a force to be measured or a torque to be measured, comprising the following features:

at least two substantially similar sensor elements which each produce an output signal in response to the force to be measured or the torque to be measured, the output signals having a Hall voltage disturbance component produced by a disturbing magnetic field and a piezoelectric signal component produced by the force or the torque, the two sensor elements being arranged such that they are displaced by essentially 90; relative to each other; and a means for subtracting the two output signals for producing a sensor signal in which the Hall voltage disturbance components are substantially compensated and the piezoelectric signal components produced by the force or the torque are substantially added.

2. A sensor arrangement according to claim 1, wherein the two sensor elements (30, 32) are arranged on a common support.

3. A sensor arrangement according to one of the claims 1 or 2, wherein the sensor elements have the following features:

a semiconductor region (10) which is adapted to be acted upon by a force or a torque, two control electrodes (12, 14) arranged on first and second spaced-apart, opposed sides of the semiconductor region (10), a current (20) flowing through said semiconductor region being producable between the control electrodes, two sensor electrodes (16, 18) arranged on third and fourth spaced-apart, opposed sides of the semiconductor region (10), wherein a force applied to the semiconductor region (10) or a torque applied to said semiconductor region is detectable, when there is a flow of current (20) between the control electrodes (12, 14), by tapping off a voltage existing between the sensor electrodes (16, 18).

4. A sensor arrangement according to claim 3, wherein the third and fourth sides of the semiconductor region (10) of the sensor elements are arranged substantially at right angles to said first and second sides.

5. A sensor arrangement according to claim 3 or 4, wherein the semiconductor region (10) of the sensor elements is doped.

6. A sensor arrangement according to claim 3 or 4, wherein the semiconductor region (10) of the sensor elements is defined by the channel of a field effect transistor, the drain and source electrodes of said field effect transistor defining the control electrodes (12, 14).

7. A sensor arrangement according to one of the claims 3 to 5, wherein an angle ($\phi$) between the dilation direction of the semiconductor region (10) and the opposed sides, on which the control electrodes (12, 14) are formed, is essentially 45°.

* * * * *